May 14, 1957
L. R. LITTLETON
2,792,178
THERMOSTATIC MIXING VALVE
Filed Nov. 24, 1954
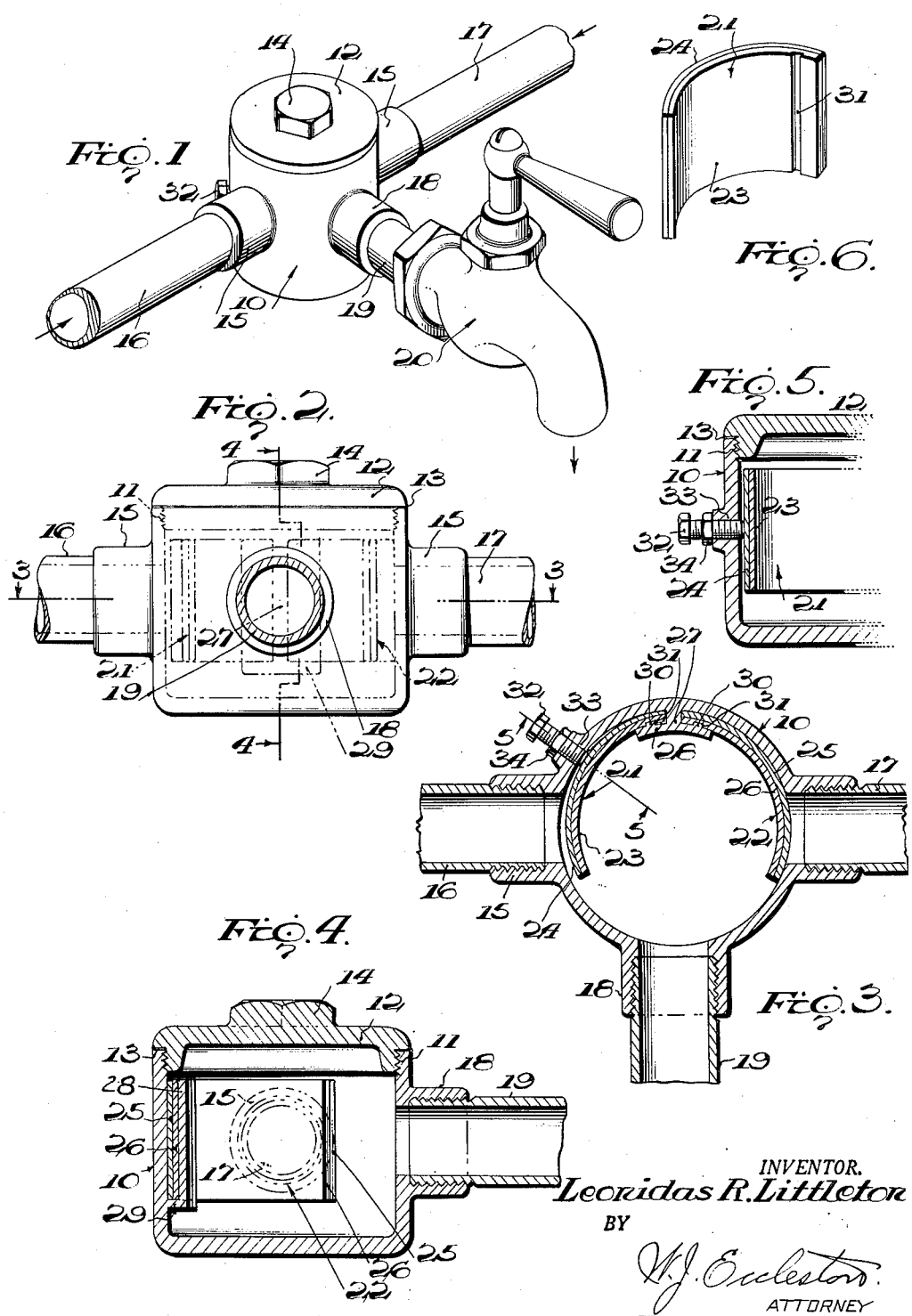
INVENTOR.
Leonidas R. Littleton
BY
W. J. Eccleston
ATTORNEY

United States Patent Office 2,792,178
Patented May 14, 1957

2,792,178

THERMOSTATIC MIXING VALVE

Leonidas R. Littleton, Arlington, Va.

Application November 24, 1954, Serial No. 471,131

8 Claims. (Cl. 236—12)

(Granted under Title 35, U. S. Code (1952), sec. 266)

The invention described herein, if patented, may be manufactured and used by or for the Government for governmental purposes, without the payment to me of any royalty thereon.

My invention relates to thermostatically controlled mixing or proportioning valves adapted to regulate the rates of flow of two different fluids at different temperatures to maintain a substantially constant temperature in the resulting mixture of fluids.

A primary object of the invention is to provide a thermostatically controlled valve of the above-mentioned character for use in connection with spigots, shower baths and the like where it is desirable to maintain a substantially constant predetermined temperature for the water flowing from the common outlet pipe of the mixing device.

A further object is to provide a fluid mixing valve which is highly simplified and economical in construction, so as to be entirely practical for use in home plumbing fixtures and the like.

Another object is to provide a thermostatic fluid mixing valve embodying a pair of separate bimetallic thermostat elements which coact directly with the hot and cold fluid inlets to the mixing chamber or casing to maintain a substantially constant temperature for the fluid therein.

Other objects and advantages of the invention will be apparent during the course of the following description.

In the accompanying drawings, forming a part of this application, and in which like numerals are employed to designate like parts throughout the same, Figure 1 is a perspective view of a fluid mixing valve in accordance with my invention, Figure 2 is a side elevation of the same, part in section, Figure 3 is a horizontal section taken on line 3—3 of Figure 2, Figure 4 is a central vertical section taken on line 4—4 of Figure 2, Figure 5 is a fragmentary vertical section taken on line 5—5 of Figure 3, and, Figure 6 is a perspective view of a bimetallic thermostat element removed.

In the drawings, wherein for the purpose of illustration is shown a preferred embodiment of the invention, the numeral 10 designates generally a mixing valve body or casing, which may be in the form of an upright cylinder closed at its bottom and open at its top. The opening in the top of the casing 10 is preferably screw-threaded at 11 for the reception of a screw-threaded plug or cap 12, serving as a closure for the casing 10. A fluid-tight gasket 13 is interposed between the top of the casing 10 and the outer marginal flange of the cap 12, as shown in the drawings. The cap 12 preferably has a polygonal wrench lug 14 formed integral thereon to facilitate applying and removing the cap 12.

A pair of tubular internally screw-threaded bosses 15 are formed integrally upon the casing 10 at diametrically opposite sides thereof and at the vertical or longitudinal center of the same. Horizontal hot and cold water inlet pipes 16 and 17 have screw-threaded engagement within the bosses 15 and communicate therethrough directly with the interior of the casing 10.

A common tubular outlet boss 18 is integrally formed upon the casing 10 midway between the bosses 15 and preferably at the same elevation as the bosses 15. The boss 18 is internally screw-threaded for the reception of the screw-threaded end of a horizontal outlet pipe 19 having a suitable manually operated common outlet valve or spigot 20 connected thereto in the usual manner, as shown.

While I have shown an ordinary spigot 20 connected with my mixing valve, for the purpose of simplifying the drawings, it is to be understood that the outlet pipe 19 may also lead to a shower bath head or nozzle or like fluid outlet means, controlled by a suitable outlet valve in the pipe 19.

For the purpose of controlling the flow of the hot and cold fluids from the pipes 16 and 17 into the casing 10, I provide a pair of separate arcuate bimetallic thermostat elements 21 and 22, as shown. These thermostat elements may be identical in construction except that the arrangement of the metal strips making up the two elements 21 and 22 is reversed with respect to the coefficients of expansion of the two metal strips at the hot and cold water inlet sides of the casing 10. At the hot water inlet side of the casing 10, the thermostat element 21 has a metal segment or strip 23 of relative high coefficient of expansion arranged upon the inner side of the element 21 with respect to a metal segment or strip 24 of a relatively low coefficient of expansion which is arranged upon the outer side of the element 21 and next to the bore of the hot water inlet boss 15. As stated, this arrangement is reversed at the cold water inlet side of the casing 10, and the metal strip 25 having a relatively high coefficient of expansion is arranged upon the outer side of the thermostat element 22, while the metal strip 26 having the low coefficient of expansion is arranged upon the inner side of the thermostat element 22. The thermostat elements 21 and 22 are of a size enabling them to cover the inlet openings or bores to the casing 10 afforded by the bosses 15.

For the purpose of readily assembling the thermostat elements 21 and 22 within the casing 10, there is formed upon the side wall of the casing 10 midway between the bosses 15 and diametrically opposite the boss 18 a short radially inwardly extending rib 27, carrying at its inner end an arcuate vertical web 28, integral therewith. The rib 27 and arcuate web 28 are integrally secured at their lower ends to an arcuate horizontal shoulder or web 29, also integrally joined to the side wall of the casing 10, and serving as a seat or support for the thermostatic elements 21 and 22. The arcuate web 28 has formed upon its outer face, on opposite sides of the ribs 27 vertical projections or keys 30 spaced from the side wall of the casing 10. Coacting vertical grooves or keyways 31 are formed in the inner faces of the bimetallic elements 21 and 22 near corresponding ends of the same, and these grooves 31 extend entirely across the thermostat elements as shown in Figure 6. In assembly, the thermostat elements 21 and 22 have their rear ends received between the arcuate web 28 and the side wall of the casing 10, the keys 30 entering the grooves 31 and serving to lock the thermostat elements against longitudinal or circumferential movement within the casing 10. The lower arcuate edges of the thermostat elements 21 and 22 are seated by gravity upon the horizontal web 29. The thermostat elements 21 and 22 are substantially circularly curved, so as to be substantially concentric with the inner surface of the cylindrical side wall of the casing 10. In assembly, the thermostat elements 21 and 22 are adapted to overlie and cover the inlet openings to the casing afforded by the bosses 15.

For the purpose of regulating the flow or volume of the hot fluid from the pipe 16 into the casing 10, I provide upon the side wall of the casing near and rearwardly of the pipe 16 and at the same elevation as this pipe a radial adjusting setscrew 32, having screw-threaded engagement within a screw-threaded opening 33 formed in the side wall of the casing 10. The setscrew 32 may carry a lock nut 34, if preferred. The arrangement is such that the inner end of the setscrew 32 engages the thermostat element 21 near its longitudinal and vertical centers for the purpose of adjusting the same toward and from the hot water inlet opening to the casing, as clearly shown in Figure 3. No adjusting setscrew is needed in connection with the thermostat element 22, but one may be provided if desired.

The purpose of the device is to supply fluid or water at a desired constant temperature from the common outlet faucet 20, shower head or the like. The bimetallic thermostat elements 21 and 22 serve to automatically control or meter the flow of hot and cold water from the pipes 16 and 17 into the mixing casing 10.

The element 21 is adjusted with the setscrew 32 to a desired degree of opening, so that the casing 10 will always be filled with water from the hot water pipe 16 even when the faucet 20 is completely closed. The rate of flow or volume from the pipe 16 at a particular desired temperature for the mixed water is controlled by the setting of the screw 32.

When the faucet 20 is first opened, the water from the hot water pipe 16 will first flow cold, as is well known. The thermostat element 22 at this time is in the closed position, Figure 3, and no cold water will flow into the casing 10 from the pipe 17. As soon as the water from the pipe 16 begins to flow warm, beyond the degree or temperature which is desired in the mixture from the faucet 20, the thermostat element 22 will begin to open automatically and some cold water from the pipe 17 will enter the casing 10 and mix with the hot water from the pipe 16. Thereafter, as the temperature of the water from the pipe 16 fluctuates in either direction, the two thermostat elements 21 and 22 will function automatically to proportion the hot and cold water from the pipes 16 and 17 flowing into the casing 10 to assure that the mixed fluid flowing from the faucet 20 will be at a constant temperature. This automatic action is facilitated and rendered more efficient by the reversed arrangement of the metal strips 23 and 25 having the high coefficients of expansion in the elements 21 and 22. When the water entering the casing 10 from the pipe 16 becomes excessively hot, its action on the thermostat element 21 having the metal strip 23 with the high coefficient of expansion on the inside will be to close the element 21 or restrict the flow of hot water from the pipe 16 into the casing 10. Conversely, the excessively hot water entering the casing 10 will tend to further open the thermostat element 22 having the metal strip 25 with the high coefficient of expansion on the outside. Thus, the two separate thermostat elements 21 and 22 with the metals of different coefficients of expansion reversed, as explained, tend to automatically regulate and maintain constant the temperature of the mixed water or fluid within the casing 10. The thermostat elements 21 and 22 are constructed to operate in the same sense and in the same direction with respect to hot water within the casing 10, and without the aid of any connecting link between the two thermostat elements.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A thermostatic mixing valve comprising a mixing casing, hot and cold fluid inlet means connected with the mixing casing, common fluid outlet means connected with the mixing casing, a pair of bimetallic thermostat elements arranged within said casing and adapted to regulate the passage of hot and cold fluid from said hot and cold fluid inlet means to the casing, each thermostat element embodying a pair of strips having different coefficients of expansion, the thermostat element adjacent the hot fluid inlet means having its strip with the high coefficient of expansion arranged innermost, the thermostat element adjacent the cold fluid inlet means having its strip with the high coefficient of expansion arranged outermost, each thermostat element being provided in one side with a groove, a supporting flange arranged within the mixing casing and engaging the bottoms of the thermostat elements to support the same, a web secured to said supporting flange and projecting above the same and spaced from the side wall of the casing, and ribs formed upon said web for engagement with the grooves of the thermostat elements when the elements are placed between the side wall of the casing and said rib and resting upon said flange.

2. A thermostatic mixing valve according to claim 1, and a setscrew mounted upon said casing and engaging the outer side of one thermostat element to regulate the degree of closing the same.

3. A thermostatic mixing valve comprising a mixing casing, hot and cold fluid inlet means connected with the mixing casing, a common fluid outlet means connected with the mixing casing, a pair of bimetallic thermostat elements arranged within the casing and adapted to regulate the passage of hot and cold fluid through said hot and cold fluid inlet means, each thermostat element embodying a pair of strips having different coefficients of expansion, the thermostat element adjacent the hot fluid inlet means having its strip with the high coefficient of expansion arranged innermost, the thermostat element adjacent the cold fluid inlet means having its strip with the high coefficient of expansion arranged outermost, each thermostat element being provided in one side with a groove, a supporting flange arranged within the mixing casing and engaging the bottoms of the thermostat elements to support the same, a web secured to said supporting flange and projecting above the same and spaced from the side wall of the casing, ribs formed upon said web for engagement with the grooves of the thermostat elements when the elements are placed between the side wall of the casing and rib and are resting upon the flange, and a removable cover for the end of the casing remote from said flange to facilitate readily removing the thermostat elements from the casing.

4. A thermostatically controlled mixer comprising a casing having a series of apertures forming inlets thereto for fluids of different temperatures and an outlet for discharging fluid therefrom, a pair of bimetallic thermostatic elements and cooperating slidably interengageable structure on one end of each of said thermostatic elements respectively and the interior of said casing rigidly to anchor the said thermostatic elements in said casing at their said one ends only so that the opposite ends thereof are free to move wholly independently of each other in response to variations in the temperature of the fluid in said casing, the said cooperating structure in said casing being disposed to locate the free ends of said thermostatic elements at a position to cooperate with the said inlet apertures respectively for controlling the flow of fluid through the same and the said thermostatic elements having their temperature responsive components disposed respectively in reverse order so that the said elements respond reversely to variations in the temperature of the fluid in said casing.

5. A thermostatically controlled mixer as defined in claim 4 wherein adjustable means is provided for regulating the degree of operation of at least one of said thermostatic elements in at least one direction.

6. A thermostatically controlled mixer comprising a casing having hot and cold liquid inlet apertures and an outlet aperture, a pair of bimetallic thermostatic elements, a pair of pockets on the inner side wall of said casing each adapted respectively slidably to receive one of the bimetallic elements, complementary keys and keyways in the said pockets and the ends of the said bimetallic elements receivable therein cooperating fixedly to anchor the said bimetallic elements in said casing at their said one ends only so that the opposite ends thereof are free to move wholly independently of each other, the said pockets being located to dispose the free ends of the said bimetallic elements at a position to cooperate with the said inlet apertures for controlling admission of liquid to said casing and the said bimetallic elements having their temperature responsive components reversely disposed so that the said elements respond reversely to variations in the temperature of the fluid in said casing.

7. A thermostatically controlled mixer comprising a casing including wall structure defining a chamber having an access opening at least one hot and one cold inlet aperture and an outlet aperture therein, a pair of bimetallic thermostatic elements, structure on the inner wall of said chamber defining narrow pockets each having a closed end and an end open to said access opening and an open side aligned therewith, said pockets each being dimensioned snugly to receive one end of a bimetallic element inserted edgewise therein through the end thereof open to said access opening, cooperating slidably interengageable structure on the ends of said bimetallic elements receivable in said pockets and the inner walls of the latter fixedly to anchor the said bimetallic elements in said casing at their said one ends only so that the opposite ends thereof are free to move wholly independently of each other, the said free ends of said anchored bimetallic elements being disposed opposite said inlet apertures respectively at a position to cooperate therewith for varying the rate of admission of fluid through said inlets in response to variations in the temperature of the fluid in said chamber and the said bimetallic elements having their temperature responsive components reversely disposed so that said elements respond reversely to variations in the temperatures of the fluid in said chamber and a removable closure for said access opening including structure to cooperate with the closed ends of said pockets for limiting edgewise movement of the bimetallic elements when the closure is seated.

8. A thermostatically controlled mixer comprising a casing having a cylindrical valve chamber formed therein open at one end and having an outlet port and hot and cold fluid inlet ports, a pair of flat bimetallic thermostatic elements of arcuate shape in an end-to-end direction, structure on the inner wall of said chamber defining narrow back-to-back pockets midway between said inlet and outlet ports each having a closed end and an end open to the open end of said chamber and an open side aligned therewith, said pockets each being dimensioned snugly to receive one end of a bimetallic element inserted edgewise therein through the open end of said chamber, cooperating slidably interengageable structure on the ends of said bimetallic elements receivable in said pockets and the inner walls of the latter to anchor the said bimetallic elements in said casing at their one ends only so that the opposite ends thereof are free to move wholly independently of each other, the said free ends of the respective bimetallic elements being disposed opposite said inlet apertures respectively at a position to cooperate therewith for varying the rate of admission of fluids through said inlets in response to variations in the temperature of the fluid in said chamber and a removable closure for the open end of said chamber including structure to cooperate with the end walls of said pockets for limiting edgewise movement of said bimetallic elements when the closure is seated.

References Cited in the file of this patent
UNITED STATES PATENTS

| | | |
|---|---|---|
| 1,000,435 | Pagelsen | Aug. 15, 1911 |
| 2,069,040 | Lodder | Jan. 26, 1937 |
| 2,221,750 | Ashby | Nov. 19, 1940 |
| 2,255,877 | Dalen | Sept. 16, 1941 |
| 2,565,425 | Hamill | Aug. 21, 1951 |